(12) United States Patent
Wei et al.

(10) Patent No.: US 7,802,143 B2
(45) Date of Patent: Sep. 21, 2010

(54) TESTING SYSTEM AND TESTING METHOD THEREOF

(75) Inventors: Chao-Hung Wei, Taipei Hsien (TW); Hong Shan, Taipei Hsien (TW); Tie-Shan Jia, Shenzhen (CN)

(73) Assignees: Shenzhen Futaihong Precision Industry Co., Ltd., ShenZhen, Guangdong Province (CN); FIH (Hong Kong) Limited, Kowloon (HK)

( * ) Notice: Subject to any disclaimer, the term of this patent is extended or adjusted under 35 U.S.C. 154(b) by 609 days.

(21) Appl. No.: 11/767,002

(22) Filed: Jun. 22, 2007

(65) Prior Publication Data

US 2008/0077821 A1 Mar. 27, 2008

(30) Foreign Application Priority Data

Sep. 22, 2006 (CN) .................. 2006 1 0062729

(51) Int. Cl.
 *G06F 11/00* (2006.01)
(52) U.S. Cl. .......................... 714/33; 714/25
(58) Field of Classification Search ............... 714/25
 See application file for complete search history.

(56) References Cited

U.S. PATENT DOCUMENTS

| | | | | |
|---|---|---|---|---|
| 4,862,067 A * | 8/1989 | Brune et al. | ............... | 324/73.1 |
| 6,385,739 B1 * | 5/2002 | Barton et al. | ............... | 714/25 |
| 6,418,389 B2 * | 7/2002 | Peter et al. | ............... | 702/108 |
| 6,868,319 B2 * | 3/2005 | Kipersztok et al. | ............ | 701/29 |
| 6,882,950 B1 * | 4/2005 | Jennion et al. | ............... | 702/118 |
| 2003/0078748 A1 * | 4/2003 | Ayadi | ............... | 702/68 |
| 2003/0226067 A1 * | 12/2003 | Anonson | ............... | 714/46 |
| 2004/0153822 A1 * | 8/2004 | Arcand et al. | ............... | 714/38 |
| 2006/0195748 A1 * | 8/2006 | Chen et al. | ............... | 714/742 |
| 2007/0025259 A1 * | 2/2007 | Reinhold | ............... | 370/241 |
| 2007/0282544 A1 * | 12/2007 | Zhang et al. | ............... | 702/55 |

FOREIGN PATENT DOCUMENTS

JP 6-18590 A 1/1994

* cited by examiner

*Primary Examiner*—Scott T Baderman
*Assistant Examiner*—Kamini Patel
(74) *Attorney, Agent, or Firm*—Jeffrey T. Knapp

(57) ABSTRACT

A present testing system (100) for testing electronic products is provided. The testing system includes a processor (10), a preliminary testing apparatus (20), and a final testing apparatus (30). The processor includes an encoding module (15) for generating product codes corresponding to the respective electronic products. The preliminary testing apparatus includes a data acquisition device (22) and a marking device (26). The data acquisition device tests the electronic products, acquires preliminary test data of the electronic products, and transmits the preliminary test data to the processor. The marking device marks the product codes onto the corresponding electronic products. The final testing apparatus includes a read device (32) for reading the product codes marked onto the electronic products and transmitting the product codes to the processor. The processor locates the corresponding preliminary testing data of the electronic products according to the product codes transmitted by the read device.

17 Claims, 4 Drawing Sheets

TESTING SYSTEM AND TESTING METHOD THEREOF

BACKGROUND OF THE INVENTION

1. Field of the Invention

The present invention relates to testing systems for testing electronic products and related testing methods thereof and, particularly, to a testing system implementing a testing method to identify untested or unqualified electronic products.

2. Description of Related Art

In the manufacturing of electronic products, various kinds of tests regarding product quality are conducted. Therefore, a testing system for these products should be able to perform various kinds of electronic tests. The typical testing system for the electronic product includes a testing apparatus and a data processor. The data processor is typically preinstalled with specified testing programs and connects/links electrically/electronically with the testing apparatus. In the process of testing, the electronic product is firstly tested by the testing apparatus in such manner that the testing apparatus generates and outputs various kinds of testing data. Secondly, the testing data of the electronic product is transmitted to the data processor and then is processed by the data processor to compute a final testing result. Finally, the final testing result is displayed by the data processor. If any electronic products are unqualified, the corresponding testing results are displayed to a worker. Thus, the unqualified electronic products are easily identified.

In general, large quantities of electronic products need to be tested before marketing. Accordingly, a large amount of testing systems works together to perform various kinds of tests for the electronic products. Workers are requested to operate several testing systems to test as many electronic products as possible. Thus, workers may inevitably make at least two types of man-made mistakes in process of testing. One mistake is that the electronic products are passed without a necessary test. Another mistake is that the electronic products are deemed unqualified by the testing system yet, however, are not identified as such by the worker.

The above mistakes are typically corrected by means of testing the electronic products more than one time, providing at least one additional opportunity to identify the untested and/or unqualified electronic products. However, this duplicative testing potentially costs much more time and/or money to carry out. In addition, the above same mistakes can be made yet again because workers may overlook the testing results more than once (i.e., repeat testing is not fail-safe; it only reduces the risk involved).

What is needed, therefore, is a testing system for testing electronic products and a testing method thereof that can overcome the above-mentioned shortcomings.

SUMMARY OF THE INVENTION

In one aspect thereof, a testing system for testing electronic products is provided. The testing system includes a processor, a preliminary testing apparatus, and a final testing apparatus. The processor includes an encoding module for generating product codes corresponding to the respective electronic products. The preliminary testing apparatus includes a data acquisition device and a marking device. The data acquisition device tests the electronic products, acquires preliminary test data for the electronic products, and transmits the preliminary test data to the processor. The marking device marks the product codes onto the corresponding electronic products. The final testing apparatus includes a read device for reading the product codes marked onto the electronic products and transmitting the product codes to the processor. The processor locates the corresponding preliminary testing data for the electronic products, according to the product codes transmitted by the read device.

In another aspect thereof, a testing method of the above testing system is provided. The testing system is initialized, then the electronic products are placed into the preliminary testing apparatus. Once placed, the electronic products are tested to acquire preliminary test data via the preliminary testing apparatus. After that, the preliminary test data is stored and then processed. Then the electronic products are respectively encoded so as to generate product codes corresponding to the electronic products via the encoding module. The product codes are stored into the processor. Then, the product codes are usefully generated in conjunction with the electronic products via the marking device. After that, the electronic products are operatively associated with the final testing apparatus and test the electronic products in order to acquire the product codes and subsequently transmit the product codes to the processor. Then, the processor locates the preliminary test data of the electronic products according to the product code information transmitted by the read device.

Other advantages and novel features will become more apparent from the following detailed description when taken in conjunction with the accompanying drawings.

BRIEF DESCRIPTION OF THE DRAWINGS

Many aspects of the present testing system and method can be better understood with reference to the following drawings. These drawings are not necessarily drawn to scale, the emphasis instead being placed upon clearly illustrating the principles of the present testing system and method. Moreover, in the drawings like reference numerals designate corresponding parts throughout the several views.

DETAILED DESCRIPTION OF PREFERRED EMBODIMENTS

The present testing system and testing method thereof is suitable for testing electronic products, e.g., portable electronic devices such as mobile phones, digital cameras, and so on.

Figure 1:
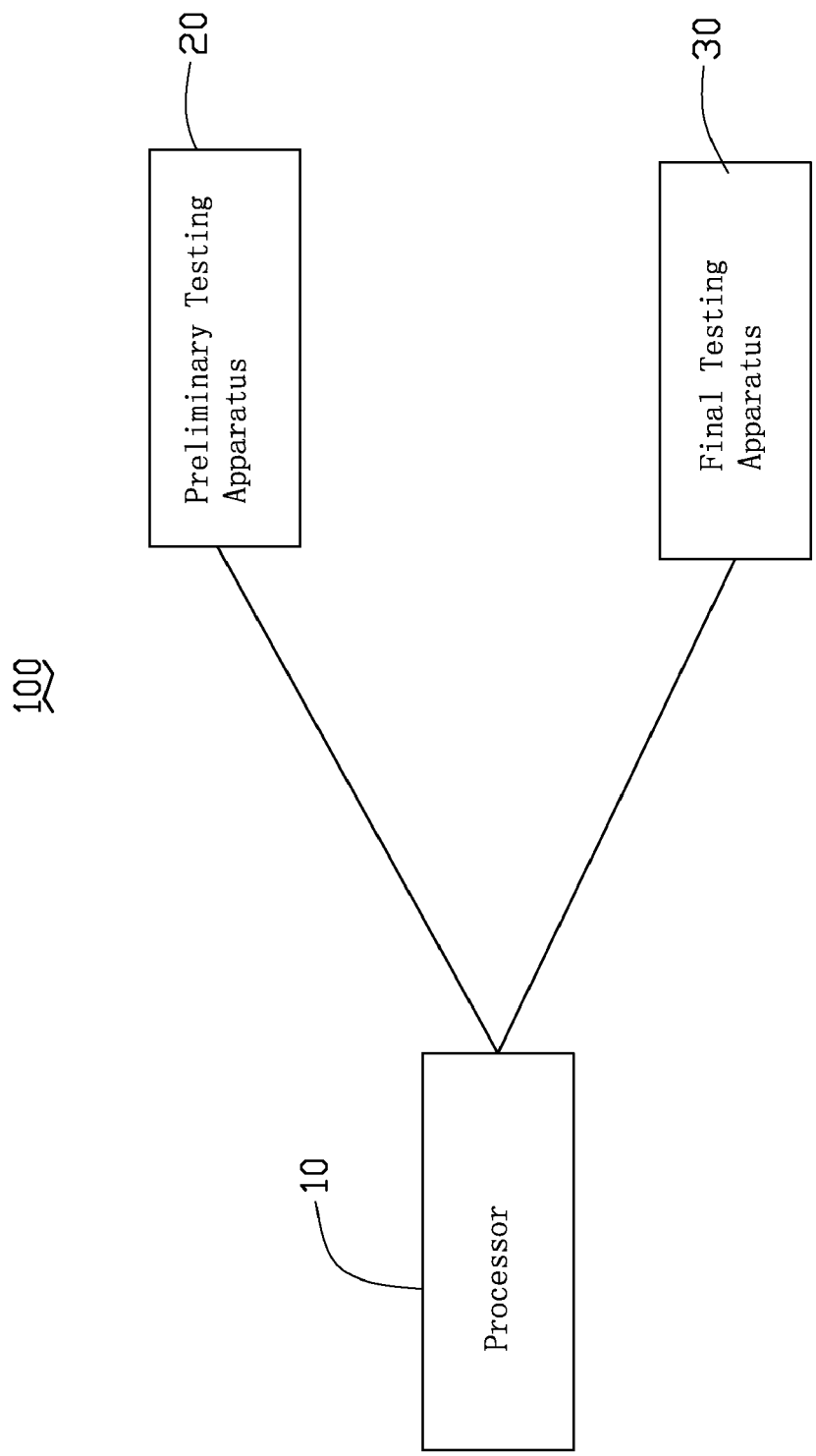
FIG. 1 is a diagram of a structure of a testing system in accordance with a present embodiment.

Referring to the drawings in detail, FIG. 1 shows a present testing system 100. The testing system 100 includes a processor 10, a preliminary testing apparatus 20, and a final testing apparatus 30. The preliminary and final testing apparatuses 20, 30 are electronically connected/coupled (e.g., via a hard-wired or wireless link) to the processor 10.

Figure 2:
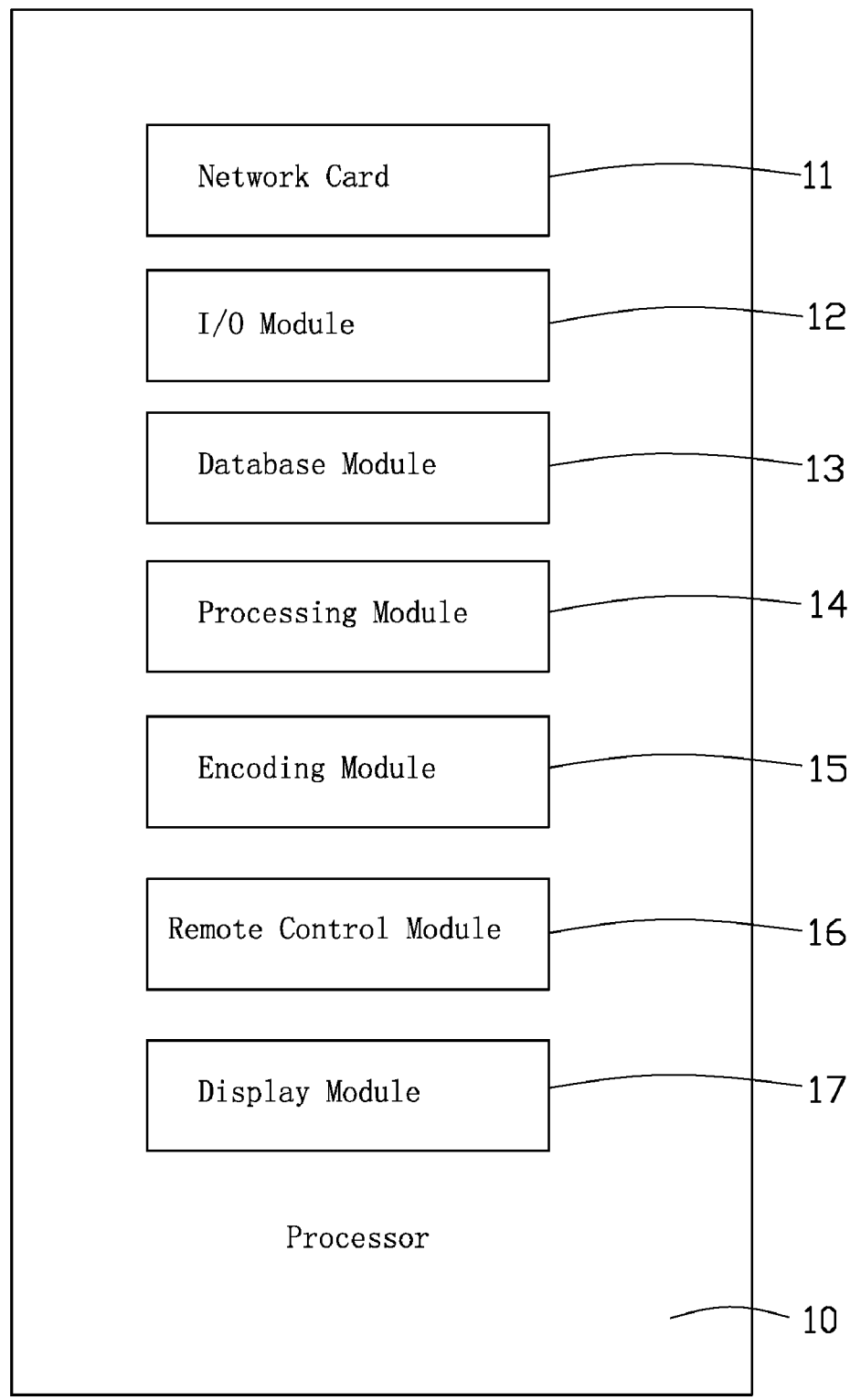
FIG. 2 is a functional module diagram of a processor of the testing system shown in FIG. 1.

Referring now to FIG. 2, the processor 10, which can be a computer (e.g., main-frame, desk-top, or lap-top) or a MCU (Micro Controller Unit), etc., includes a network card 11, an I/O module 12, a database module 13, a processing module 14, an encoding module 15, a remote control module 16, and a display module 17. The processor 10 connects/couples with the first and final testing apparatuses 20, 30 via the network card 11. Various kinds of information or signals, such as test data of electronic products or control instructions generated and sent by the remote control module 16, etc, can be transmitted between the processor 10 and the testing apparatuses 20, 30 via the I/O module 12 and the network card 11.

The database module 13 has one or more specified testing programs installed therein and can set up and store standard product data corresponding to respective electronic products. The database module 13 can further store product code information, as generated by the encoding module 15, and the test data accumulated for the given electronic products. The processing module 14 can process a comparison between the standard product data and the corresponding test data for the evaluated electronic products. The encoding module 15 functions to generate respective product codes corresponding to the electronic products. The remote control module 16 can execute various kinds of instructions to remotely control (e.g., via a wireless link) the testing of the preliminary and final testing apparatuses 20, 30. The display module 17 can display testing results of the preliminary test and/or the final test, as desired/requested.

Figure 3:
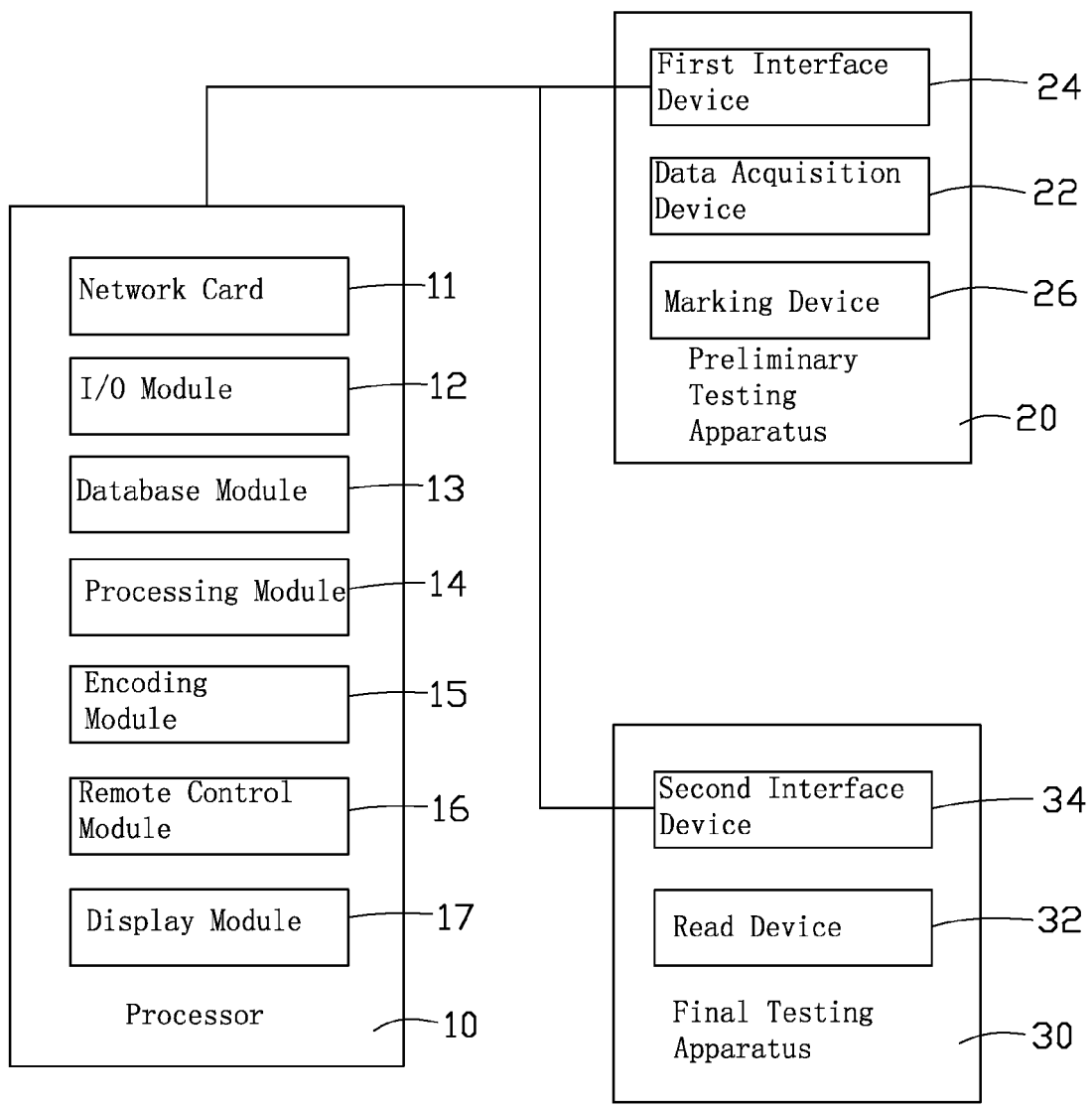
FIG. 3 is a diagram of a preliminary testing apparatus and a final testing apparatus being respectively connected to the processor shown in FIG. 2.

Referring also to FIG. 3, the preliminary testing apparatus 20 includes a data acquisition device 22, a first interface device 24, and a marking device 26. The data acquisition device 22 includes one or more testing devices (not shown), e.g., a universal meter, a voltmeter/ohmmeter, and/or a force transducer, which can perform various kinds of tests for the electronic products. Thus, the data acquisition device 22 can acquire test data for such products. The first interface device 24 connects/couples with the network card 11 of the processor 10 so as to transmit test data, as acquired by the data acquisition device 22, to the processor 10. The first interface device 24 can also transmit the product codes, encoded by the encoding module 15 of the processor 10, to the marking device 26.

The marking device 26 can acquire the respective product codes of the electronic products and then mark/tag the respective product codes on the corresponding electronic products. More specifically, the marking device 26 can advantageously physically mark the product code on the electronic product, e.g., in form of a bar code. Alternatively, the product code could potentially be otherwise marked/identified with respect to a given product (e.g., in the form of a stored electronic identifier). The final testing apparatus 30 includes a read device 32 and a second interface device 34. The read device 32 can read/detect the product codes marked on or otherwise associated with the electronic products. More specifically, the read device 32 can usefully be a bar code read device, such as a bar code scanner, for when the product code is in the form of a bar code. The second interface device 34 connects with the network card 11 of the processor 10, allowing the product codes read by the read device 32 to be transmitted to the processor 10.

Figure 4:
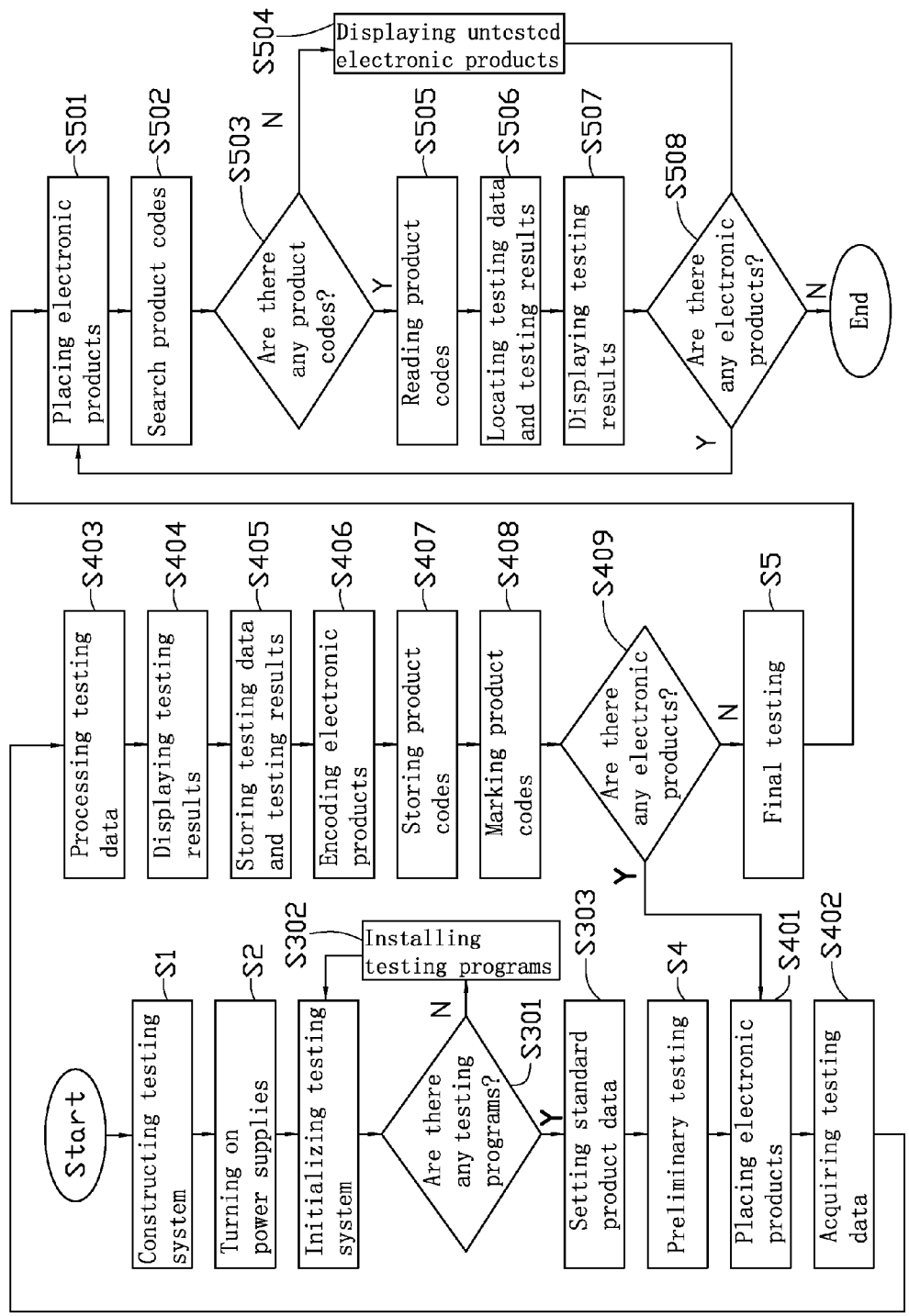
FIG. 4 is a flow chart of a testing method employing the testing system shown in FIG. 1.

Referring also to FIG. 4, a flow chart showing a testing method of the testing system 100 for testing electronic products is provided. The testing method includes a plurality of steps, as follows.

In constructing the testing system 100 (Step S1), the first interface device 24 of the preliminary testing apparatus 20 and the second interface device 34 of the final testing apparatus 30 are connected to the network card 11 of the processor 10. Thus, the preliminary testing apparatus 20 and the final testing apparatus 30, combined with the processor 10, cooperatively constitute the testing system 100.

By turning on respective power supplies (Step S2), the processor 10, the first and final testing apparatus 20, 30 are respectively started/activated.

In the initialization of the testing system 100 (Step S3), firstly, the testing system 100 checks whether testing programs have been appropriately loaded in the database module 13 of the processor 10 (Step S301). If testing programs are not suitably set up, the testing programs will install in the database module 13 (Step S302) and then set standard product data (Step S303). If the testing programs have already been loaded in the database module 13, Step S302 can be omitted and Step S303 can sequently be implemented to finish the initialization of the testing system 100.

After initialization, a preliminary test of the electronic products is carried out by the testing system 100 (Step S4). The remote control module 16 of the processor 10 executes controlling instructions, so that the electronic products are placed into the data acquisition device 22, in sequence (Step S401). Subsequently, the remote control module 16 of the processor 10 controls the operation of the particular testing device(s) of the data acquisition device 22 in order to acquire various kinds of preliminary test data for the given electronic products, again in sequence (Step S402).

Then, the preliminary test data is transmitted to the processing module 14 of the processor 10, via the first interface device 24 of the preliminary testing apparatus 20 and the I/O module 12 of the processor 10. Then, the processing module 14 processes the preliminary test data (Step S403). Specifically, the preliminary test data is compared with the standard product data stored in the database module 13. When the preliminary test data falls within a reasonable/acceptable scope of the standard product data, the electronic product is qualified. If not, the electronic product is deemed to be unqualified. Then, the result of the comparison is displayed via the display module 17 (Step S404), and the preliminary test data of the qualified product is stored in the database module 13 (Step S405). Thus, the worker is notified to remove this unqualified electronic product from the production line.

After that, the encoding module 15 of the processor 10 encodes each electronic product, and each electronic product is provided with a respective product code (Step S406). Then, the product code of each electronic product is stored into the database module 13. The database module 13 constructs a one-to-one corresponding relation between the product code of the electronic product and the preliminary testing data thereof (Step S407). Subsequently, the product code is transmitted to the marking device 26 of the preliminary testing apparatus 20. The preliminary testing apparatus 20 advantageously marks a bar code onto the electronic product or otherwise tags such, according to the product code of the electronic product (Step S408).

In the following step, the testing system 100 checks whether there still exists other electronic products that need to be tested (Step S409). If at least one untested electronic product remains, the preliminary test will be repeated via Step S401 through Step S409. If all electronic products have been tested, the preliminary test will end.

A final test for each electronic product can, usefully, be implemented right after (i.e., immediately after) the preliminary test (Step S5) for such, thus helping to keep production time compact and to reduce the opportunity for an untested or unsatisfactory product proceeding further in processing. Each electronic product is thus placed into the final testing apparatus 30 or otherwise coupled therewith. The remote control module 16 of the processor 10 executes instructions to transfer the electronic product into the read device 32 of the final testing apparatus 30 (Step S501). The read device 32 is controlled by the remote control module 16 to scan the bar code of the electronic product or to otherwise read the associated product tag and thus identify the corresponding product code thereof (Step S502).

If the product code of the electronic product is not identified, the electronic product would definitely not have initially been tested (Step S503). At this time, the display module 17 of the processor 10 displays that the electronic product has yet to be appropriately tested, alerting the worker(s) of the need to appropriately test such a product (Step S504). If the product code of the electronic product is identified, the electronic product definitely has already been tested. The product code of the electronic product would be read and transmitted to the processor 10 via the second interface 34 of the final testing apparatus 30 (Step S505). According to the product code, the processing module 14 of the processor 10 locates the corresponding preliminary testing data of the qualified product and the corresponding testing result thereof (Step S506). If the electronic product is not qualified/acceptable, the testing result will be displayed via the display module 17 (Step S507). Thus, the worker is notified to remove this unqualified electronic product.

Finally, the testing system 100 checks whether there still exists untested electronic products that need to be tested (Step S508). If one or more untested electronic products remain, the final test will be repeated via Step S501 through Step S509. If all electronic products have been tested, the final test will end.

The main advantages of the testing system 100 and the testing method thereof are as follows. The electronic product is preliminarily tested by the preliminary testing apparatus 20 and is encoded and marked, in sequence, by the encoding module 15 and the marking device 26, respectively. During the preliminary testing process, the testing system 100 first notifies the worker(s) to remove the unqualified electronic product. In final test for the electronic product, the product code encoded in the preliminary test is read and identified. There is no need to generate the test data of the electronic product again, because the test data generated in the preliminary test has been stored in the database module 13. Thus, an untested electronic product or unqualified electronic product can easily and quickly be identified. During the final testing process, the workers are notified again to remove the unqualified electronic product again or are requested to test an otherwise yet untested electronic product. Therefore, the unqualified and untested electronic product is easily and quickly to be identified. As such, a risk of overlooking unqualified and untested electronic product in manufacture is certainly greatly reduced, if not almost eliminated.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A testing system for testing electronic products, the testing system operating in a preliminary testing mode and a final testing mode, the final testing mode implemented after the preliminary testing mode, the electronic products tested to be sequentially qualified, or to be unqualified and then notified for removal in the preliminary and final testing modes, or untested in the preliminary testing mode and notified in the final testing mode, the testing system comprising:

a processor including an encoding module for generating product codes corresponding to the un-removed electronic products in the preliminary testing mode, the processor stored with standard product data;

a preliminary testing apparatus coupled with the processor, the preliminary testing apparatus including:

a data acquisition device for testing the electronic products, acquiring preliminary test data of the electronic products, and transmitting the preliminary test data to the processor, in the preliminary testing mode, the processor comparing the preliminary test data with the standard product data to determine the qualified electronic products and the un-qualified electronic products, the un-qualified electronic products notified by the preliminary testing apparatus to be removed; and a marking device for marking the un-removed electronic products after the preliminary testing according to the product codes in conjunction with the electronic products; and a final testing apparatus coupled with the processor, the final testing apparatus including a read device for reading the marked product codes associated with the electronic products and transmitting the read, marked product codes to the processor;

wherein, in the final testing mode, the processor locates the preliminary testing data of the tested electronic products according to the product codes transmitted by the read device, and the processor compares the preliminary test data with the standard product data to determine the qualified electronic products and the un-qualified electronic products, the un-qualified electronic products notified to be removed;

wherein, in the final testing mode, the untested electronic products by the preliminary testing mode are notified by the final testing apparatus if the respective product codes not identified by the preliminary test data.

2. The testing system as claimed in claim 1, wherein the processor further comprises a database module for installing at least one testing program and for storing the standard product data, the product code, and the preliminary test data associated with the electronic products.

3. The testing system as claimed in claim 2, wherein the processor further comprises a processing module for processing the comparison between the standard product data and the preliminary test data of the electronic products, locating the preliminary testing data according to the read and marked product code, and generating testing results.

4. The testing system as claimed in claim 3, wherein the processor further comprises a display module for displaying testing results.

5. The testing system as claimed in claim 1, wherein the processor further comprises a remote control module for executing control instructions to remotely control the testing of the preliminary and final testing apparatuses.

6. The testing system as claimed in claim 5, wherein the processor further comprises an I/O module for transmitting the preliminary test data for the electronic products and control instructions generated and sent by the remote control module between the processor and the testing apparatuses.

7. The testing system as claimed in claim 1, wherein the processor further comprises a network card for interconnecting the preliminary testing apparatus with the processor and interconnecting the final testing apparatus with the processor.

8. The testing system as claimed in claim 7, wherein the preliminary further comprises a first interface device and a second interface device, the first interface device and the second interface device respectively connecting with the network card.

9. A testing method of a testing system for testing electronic products,
the testing system including a processor, a preliminary testing apparatus, and a final testing apparatus, the processor including an encoding module, the preliminary testing apparatus including a marking device, the processor stored with standard product data, the final testing apparatus including a read device, the testing method comprising:
operatively associating the electronic products, respectively, with the preliminary testing apparatus and testing the electronic products to acquire preliminary test data via the preliminary testing apparatus, and transmitting the preliminary test data to the processor;
storing and processing the preliminary test data by the processor to compare with the standard product data to determine the electronic products whether qualified or un qualified,
notifying the un-qualified electronic products to be removed;
encoding the un-removed electronic products to generate product codes, corresponding to the un-removed electronic products, via the encoding module;
storing information associated with the product codes into the processor;
marking the product codes in a manner to operatively associate a given product code with a respective electronic product, the marking being performed via the marking device;
operatively associating the electronic products, respectively, with the final testing apparatus and reading the marked product codes associated with the electronic products by the read device and transmitting the read, marked product codes to the processor; and
locating the preliminary test data of the electronic products according to the product codes transmitted from the read device, the locating being performed via the processor;
determining the electronic products the un-removed electronic products whether qualified or unqualified;
notifying the unqualified electronic products to be removed;
notifying the untested electronic products by the preliminary testing apparatus by the final testing apparatus if the respective product codes not identified by the preliminary test data.

10. The testing method as claimed in claim 9, wherein the preliminary testing apparatus further comprises a data acquisition device, the data acquisition device tests the electronic products during the preliminary test to acquire the preliminary test data of the electronic products and then transmits the preliminary test data to the processor.

11. The testing method as claimed in claim 9, wherein the marking device physically marks the product codes onto the corresponding electronic products.

12. The testing method as claimed in claim 9, wherein the processor further comprises a database module, the information associated with the product codes being stored into the database module.

13. The testing method as claimed in claim 9, wherein the processor further comprises a database module, the database module checking whether with at least one desired testing program is installed prior to the preliminary testing, the database module setting and storing the standard product data for the respective electronic products, the database module storing the preliminary test data.

14. The testing method as claimed in claim 13, wherein the processor further comprises a processing module, the processing module comparing the standard product data and the preliminary test data for the respective electronic devices and generating testing results.

15. The testing method as claimed in claim 14, wherein the processor further comprises a display module, the display module displaying the testing results.

16. The testing method as claimed in claim 9, wherein the processor further comprises a processing module, the processing module locating the preliminary testing data according to the product codes and generating testing results.

17. The testing method as claimed in claim 16, wherein the processor further comprises a display module, the display module displaying the testing results.

* * * * *